No. 822,565. PATENTED JUNE 5, 1906.
T. H. WHELESS.
SUBMARINE BOAT.
APPLICATION FILED APR. 12, 1904.
5 SHEETS—SHEET 2.
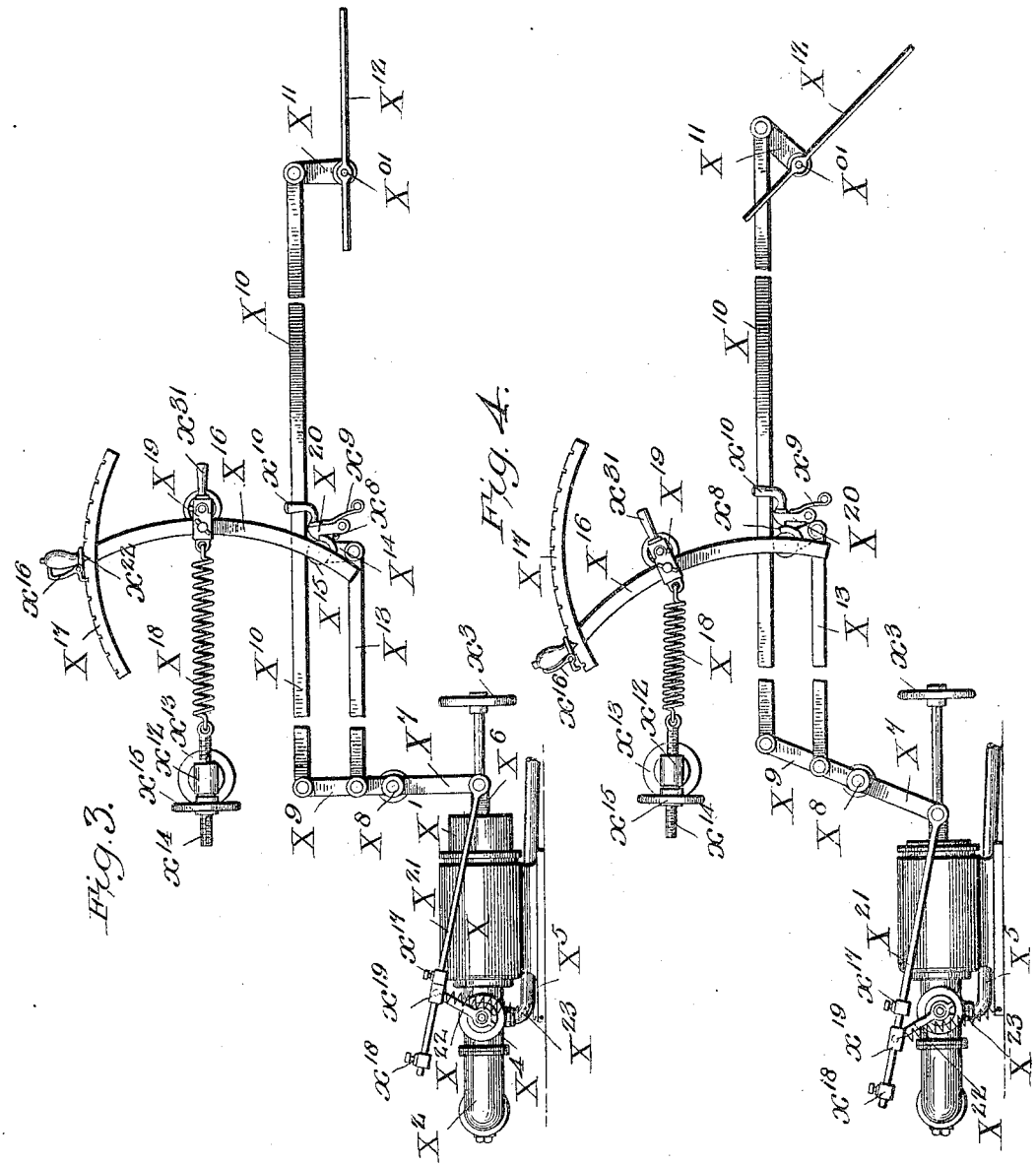
Inventor
T. H. Wheless.
Witnesses
By Wilkinson & Fisher
Attorneys.

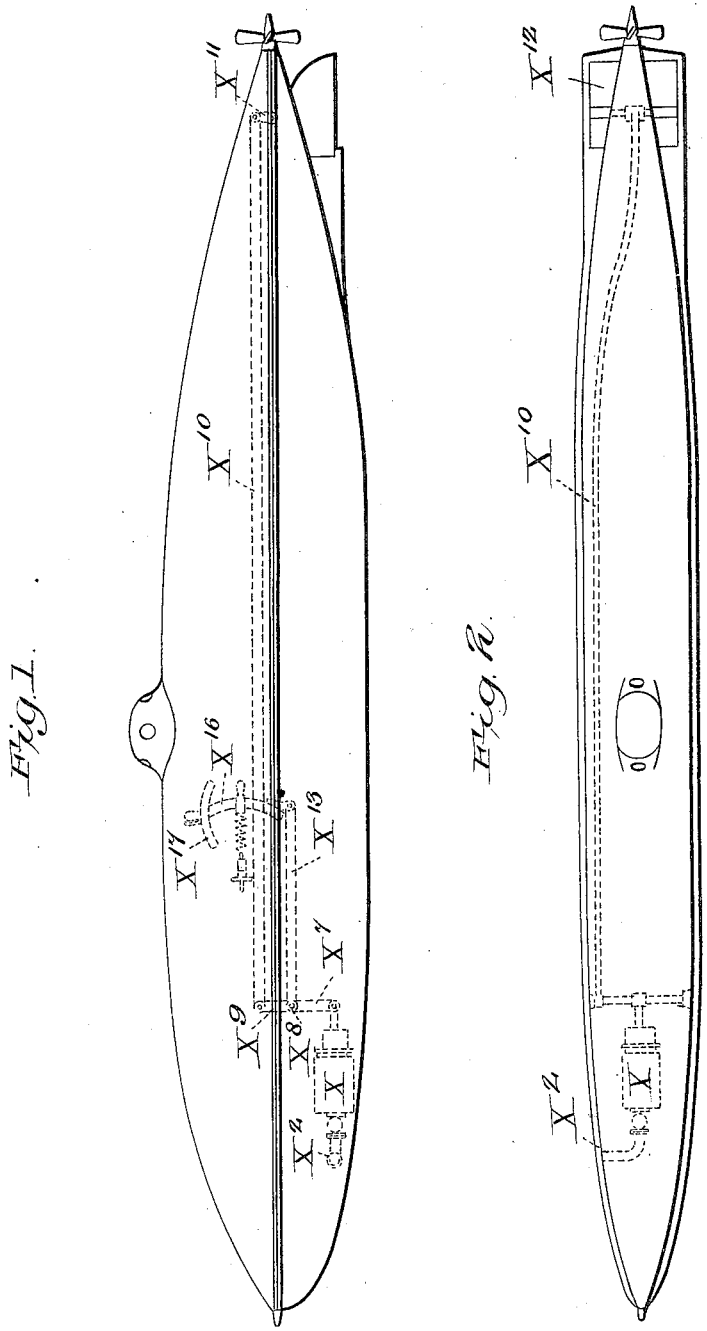

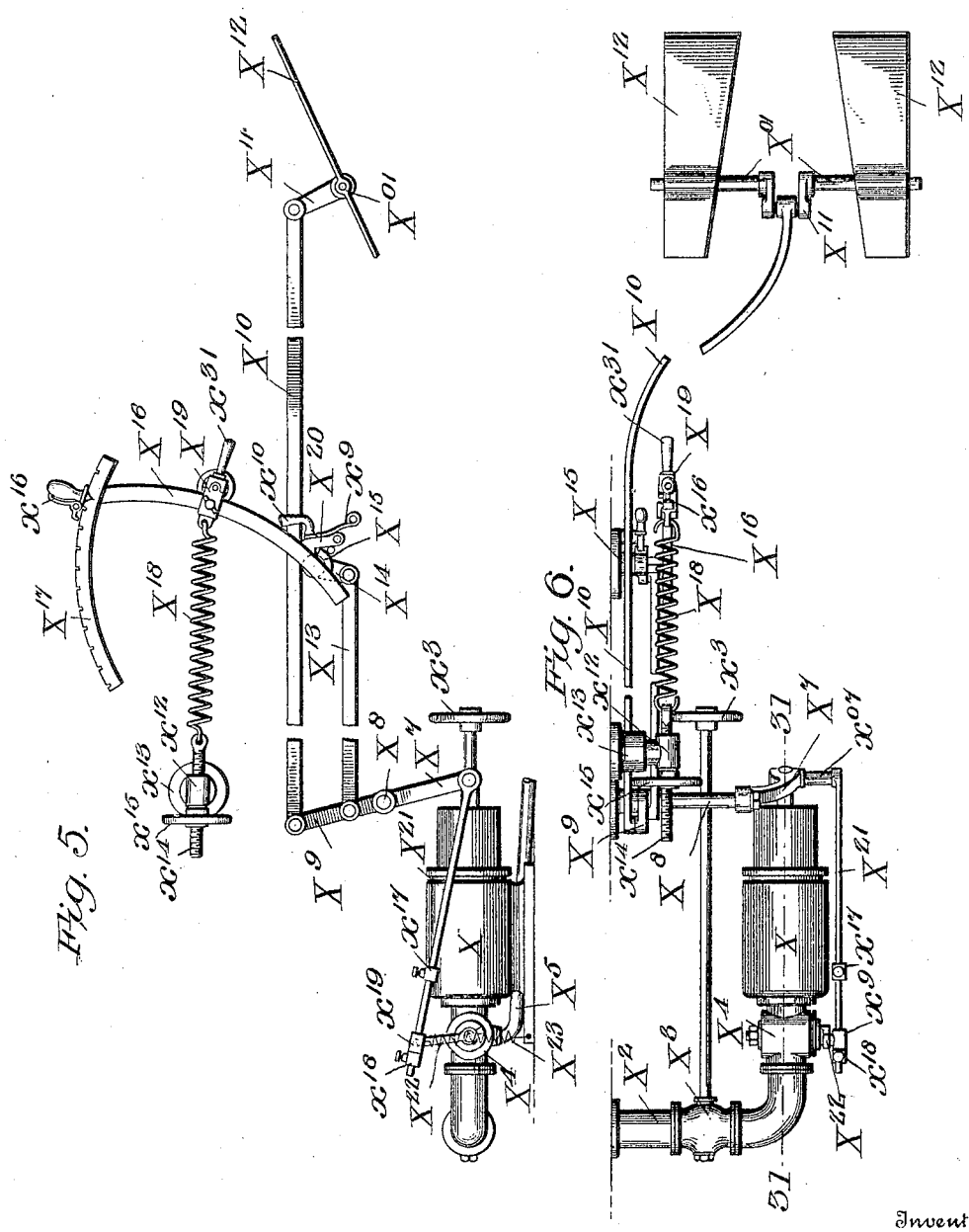

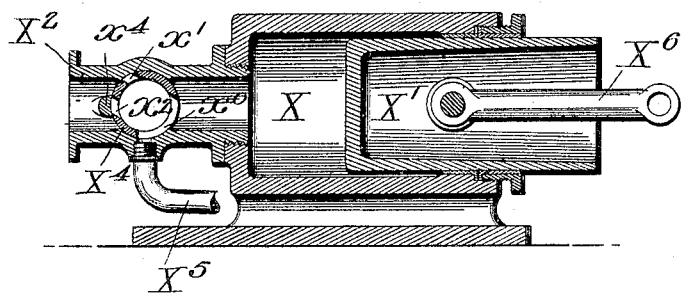
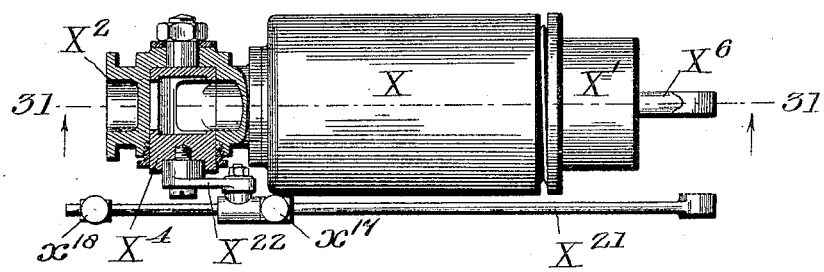
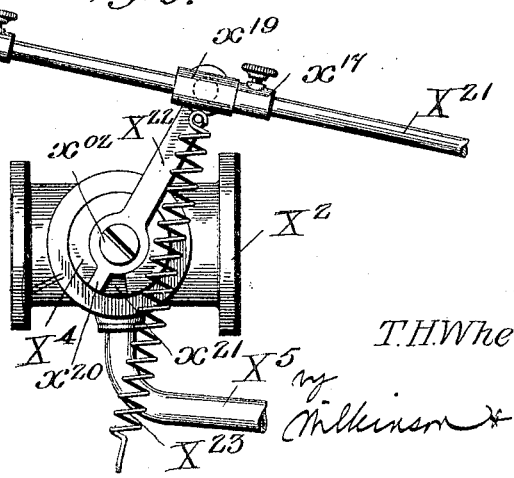

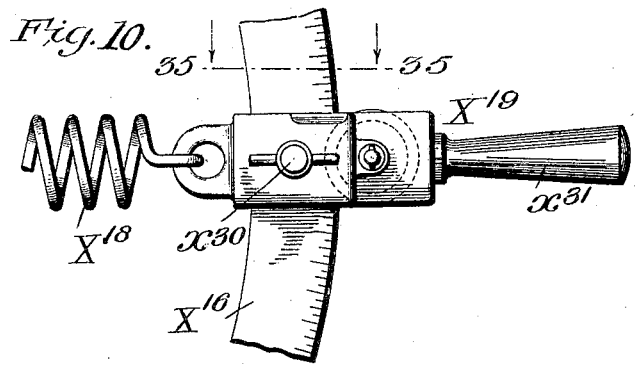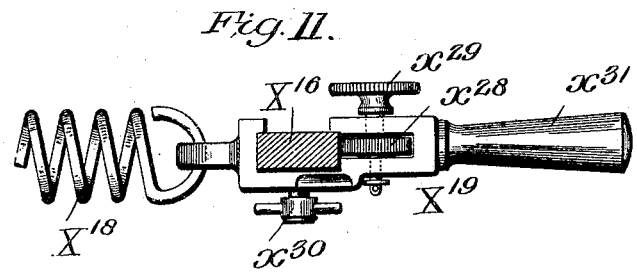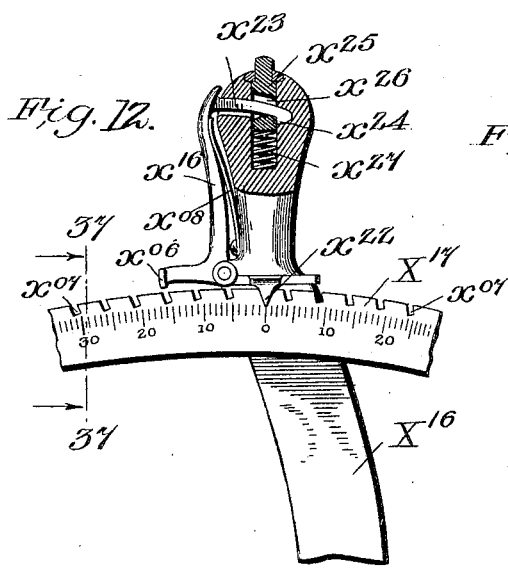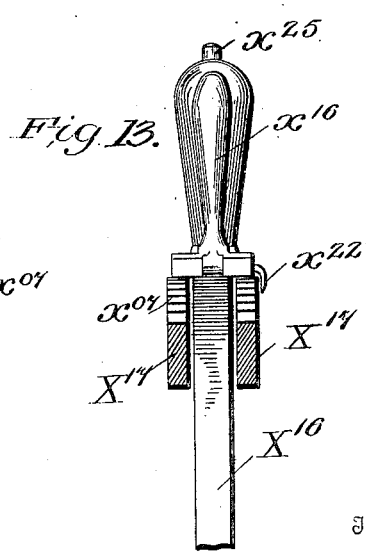

UNITED STATES PATENT OFFICE.

THOMAS HENRY WHELESS, OF NEW YORK, N. Y.

SUBMARINE BOAT.

No. 822,565.  Specification of Letters Patent.  Patented June 5, 1906.

Application filed April 12, 1904. Serial No. 202,812.

*To all whom it may concern:*

Be it known that I, THOMAS HENRY WHELESS, a citizen of the United States, residing at New York city, in the State of New York, have invented certain new and useful Improvements in Submarine Boats, (Case G;) and I do hereby declare the following to be a full, clear, and exact description of the invention, such as will enable others skilled in the art to which it appertains to make and use the same.

My invention relates to improvements in submarine boats, and more especially to apparatus for causing the boat to rise or dive when desired, and for maintaining the boat at any desired depth below the surface of the water.

My invention will be understood by reference to the accompanying drawings, in which the same parts are indicated by the same letters throughout the several views.

Figure 1 is a side elevation of the boat on a small scale. Fig. 2 is a plan view of the same. Fig. 3 shows diagrammatically the diving mechanism in the zero or initial position, parts being broken away. Fig. 4 is a similar view to Fig. 3, showing the diving mechanism adjusted for maximum dive. Fig. 5 shows the diving mechanism adjusted for rising to the surface. Fig. 6 shows a plan view of the diving mechanism. Fig. 7 is a detail through the immersion-cylinder which controls the diving mechanism, being a section along the line 31 31 of Figs. 6 and 8. Fig. 8 is a side elevation of the immersion-cylinder, the valve-casing being broken away. Fig. 9 is a detail showing the means for automatically controlling the immersion-valve. Fig. 10 is a detail showing the hand adjustment for regulating the spring tension of the diving mechanism. Fig. 11 shows a section along the line 35 35 of Fig. 10 and looking down. Fig. 12 is a detail, parts being broken away, and shows the auxiliary means for adjusting the spring tension; and Fig. 13 shows a section along the line 37 37 of Fig. 12 and looking in the direction of the arrows.

The hull of the boat may be of any preferred form or type—such, for instance, as is shown in Figs. 1 and 2—and may be provided with any suitable motive power.

The immersion of the boat is regulated by means of the diving apparatus, which will now be described. This is shown on a small scale in dotted lines in Figs. 1 and 2 and is shown in detail in Figs. 3 to 13. This apparatus is controlled by a cylinder X and a piston X′, which cylinder is connected to the water outside of the vessel by means of the pipe $X^2$, which pipe is closed by the valves $X^3$ and $X^4$. The valve $X^3$ is operated by hand by means of the hand-wheel $x^3$, and the valve $X^4$ is automatically operated in the manner as will be hereinafter described. This valve $X^4$ is in the form of a hollow cylinder provided with a large port $x^0$, which connects the interior of the cylinder X with the waste-pipe $X^5$, which leads to the bilge-water. The valve $X^4$ is also provided with two admission-ports $x'$ and $x^2$, which are closed, respectively, by the valve-casing and by the bridge $x^4$, as shown in Fig. 7. The advantage of having two of these admission-ports is merely to secure quick action. This valve is operated either by hand or by the automatic mechanism that will be hereinafter described.

The piston X′ is in the form of a hollow cylindrical plunger, to which is pivoted the piston-rod $X^6$, (see Fig. 7,) which piston-rod is connected to the crank $X^7$, which crank is connected to the shaft $X^8$. This shaft $X^8$ carries the crank $X^9$, to which are connected the rods $X^{10}$ and $X^{13}$. The rod $X^{10}$ extends to the stern of the boat and is connected to the bell-crank $X^{11}$, which is rigidly attached to the shaft $X^{0'}$, to which the diving-rudders $X^{12}$ are rigidly attached. Thus it will be seen that any motion of the piston-rod $X^6$ will be transmitted to the diving-rudders $X^{12}$.

The rod $X^{13}$ connects the crank $X^9$ with the crank $X^{14}$, which is rigidly attached to the shaft $X^{15}$, which shaft carries the curved arm $X^{16}$, which arm rocks with said shaft. The upper end of this arm carries a spring-operated pawl $x^{16}$, which engages with a curved rack $X^{17}$. To this curved arm $X^{16}$ a spring $X^{18}$ is connected by means of the frame $X^{19}$. (Shown in detail in Figs. 10 and 11.) The opposite end of this spring is connected to the screw $x^{14}$, which passes loosely through the sleeve $x^{12}$, swiveled in the bearing $x^{13}$, fast to the framework of the vessel, and on this screw $x^{14}$ is mounted the adjusting-nut $x^{15}$, by means of which nut the tension of the spring may, in a measure, be adjusted. The arm $X^{16}$ is preferably made curved with such a radius that when in the zero position the frame $X^{19}$ may be moved along said curved arm without varying the tension of said spring. This frame $X^{19}$ is adjusted to travel over the curved arm $X^{16}$ and to be clamped in any desired position thereon by means of the clamp-screw $x^{30}$. This frame carries an anti-friction-roller $x^{28}$, which for nice adjustments may be turned by the milled head $x^{29}$ on the same shaft with said roller. For convenience in moving the frame $X^{19}$ a handle $x^{31}$ is provided. It will be seen that by moving this frame $X^{19}$ away from the axis of the curved arm $X^{16}$ the tension of the spring will not be changed, but the leverage at which the spring $X^{18}$ acts will be increased, while if the frame $X^{19}$ be moved toward the pivot-shaft $X^{15}$ the leverage at which the spring $X^{18}$ acts will be reduced. In this way the the spring may be so set as to meet the requirements of running the boat at various depths below the water. This movement of the frame $X^{19}$ therefore is merely an adjustment of the constant or means for regulating the mean depth at which it is purposed to have the boat travel. To vary the depth quickly when desired, the curved arm $X^{16}$ is moved outward or inward along the curved rack $X^{17}$. This arm $X^{16}$ carries a pointer $x^{22}$, which indicates the angles the said arm is moved along the graduated rack $X^{17}$ and also indicates the angle through which the rudder is turned in either direction. This curved arm $X^{16}$ may be always under the control of the operator or may be moved and locked in different positions, as will now be explained.

Referring to Figs. 12 and 13, the pawl $x^{16}$ is in the form of a bell-crank, having a tooth $x^{06}$, adapted to engage in the notches $x^{07}$ of the curved rack $X^{17}$. This bell-crank $x^{16}$ carries a hook $x^{23}$, which projects into the handle of the arm $X^{16}$ and passes through the slot $x^{26}$ of the push-button $x^{25}$, so that the hook portion $x^{24}$ of said tongue $x^{23}$ is normally held by the said push-button under the action of the spring $x^{27}$, as shown in Fig. 12. By pushing down on this push-button the spring $x^{08}$ snaps the tooth $x^{06}$ down into one of the notches $x^{07}$, and thus holds the arm $X^{16}$ in the desired position. Upon releasing the pawl $x^{16}$ again, the push-button rises up to the position shown in Fig. 12, thus once more placing the curved arm $X^{16}$ under the control of the operator. Thus it will be seen that this arm may be freely controlled by hand or may be locked in any desired position at the will of the operator.

Where it is desired to operate the device by hand, it is preferable to swing the frame $X^{19}$ down to the zero-point—that is, abreast of the pivot $X^{15}$—at which time the spring $X^{18}$ does not exert any tension tending to swing the curved arm $x^{16}$ about said pivot.

The crank $X^7$ is curved, as shown, and carries an extension $x^{07}$, to which the rod $X^{21}$ is pivoted. This rod carries two adjustable stops $x^{17}$ and $x^{18}$, between which the sliding sleeve $x^{19}$ travels. This sleeve is pivotally connected to the arm $X^{22}$, which is pivoted to the valve $X^4$, as by means of the screw $x^{02}$. This arm carries a tongue $x^{20}$, which projects into the segmental slot $x^{21}$ in the valve and brings it against one or the other face of said slot as the arm $X^{22}$ vibrates. This arm $X^{22}$ is under the tension of the spring $X^{23}$, which tends to pull it over in one direction or the other, so that when the arm $X^{22}$ passes the center in either direction the spring $X^{23}$ will snap the valve through an angle which is limited by the position of the stops $x^{17}$ and $x^{18}$.

Having thus described the mechanical details of the parts, the operation of the diving apparatus will be readily understood after a short further description. Fig. 3 shows the parts in the initial or zero position, with the diving-rudders horizontal and the pointer $x^{22}$ pointing at the zero-mark, as indicated in Fig. 12. At this time the boat is presumed to be at the surface, and assuming that it be desired to cause the boat to dive the spring-catch $X^{20}$ is released by drawing back the handle $x^{10}$ against the action of the spring $x^9$, which will release the hook of said pawl from engagement with the lug $x^8$ on the shaft $X^{15}$. When the curved arm $X^{16}$ is thrown forward to the position shown in Fig. 4, it will be held in this position by the spring $X^{18}$, unless it is desired to throw the pawl $x^{16}$ into one of the notches in the arc $X^{17}$, as before described. This forward movement of the curved arm $X^{16}$ will drag the lever $Y^9$ back, forcing the crank $X^7$ forward and shoving the piston $X'$ into the cylinder $X$. At the same time the rod $X^{21}$ will be forced forward, causing the stop $x^{17}$ to force the sleeve $x^{19}$ forward, rocking the arm $X^{23}$ beyond the vertical position, when the spring $X^{23}$ will snap the valve open in the position shown in Fig. 4. It is presumed, of course, that the valve $X^3$ has been previously opened. This opening of the valve $X^4$ will cause the water of flotation to press upon the front face of the piston $X'$, and the pressure of the water will be in the opposite direction to the effect of the spring $X^{18}$, and the piston, with the parts attached thereto, will assume a position which represents the balance of power between the pressure of water on the front face of the piston and the tension of the spring pressing on the rear face of the piston, neglecting, of course, any friction in the apparatus. When the boat approaches the depth to which the apparatus is adjusted, the pressure of the water of flotation on the front face of the piston will move the parts to the position shown in Fig. 5, thus bringing the rudder in the opposite position and forcing the boat from a downward inclined course to a horizontal course at the desired depth. About the time this position is reached the rod $X^{21}$ will rock the valve $X^4$ back to the closed position, opening the pipe $X^5$ to the bilge-water and cutting off all water-pressure from the cylinder. This will cause the spring $X^{18}$ to snap the arm $X^{16}$ backward; but this arm will be locked in the zero position by means of the spring-catch $X^{20}$. This will bring all the parts to the position shown in Fig. 3. The rudders $X^{12}$ being horizontal, the boat will tend to follow a course at the predetermined depth; but any deviations from the proper course may be compensated for or corrected by the operator at the curved arm $X^{16}$.

A peculiar feature of this mechanism is that when the boat in diving reaches the horizontal plane the rudders are automatically set at steady by the cut-off valve $X^4$ and are thus maintained by action of the spring $X^{18}$ instead of by hydrostatic pressure. The reopening of valve $X^4$ would result in the water-pressure throwing the rudders in the position shown in Fig. 5, thus forcing the boat from a horizontal position to an upwardly-inclined position.

It is obvious that the frame $X^{19}$ may be fixed at the fulcrum $X^{15}$ and the curved arm $X^{16}$ controlled manually, so as to operate the diving mechanism entirely independent of its automatic features, if desired. When operating the diving apparatus manually, it would be preferable to close the valve $X^3$.

The rack $X^{17}$ is graduated to indicate the angle to which the curved arm $X^{16}$ is turned, or, if preferred, the graduations may be calibrated to show the angle through which the rudder is turned. With the increased leverage incident to the increased distance of the spring $X^{18}$ from the fulcrum at $X^{15}$ it will require a greater pressure of water upon the piston to counteract the tension of the spring than would be required if the spring $X^{18}$ were set at a nearer point to the fulcrum $X^{15}$. For this reason the arm $X^{16}$ is preferably graduated to show the respective depths in feet at which it may be desired to run the boat, and such depths may be controlled by moving the frame $X^{19}$ up or down on the said curved arm $X^{16}$, thus regulating the leverage at which the spring acts in opposition to the water on the front face of the piston, as above described. In order to compensate for difference in density of water as well as for friction of the parts of the mechanism and also for adjusting the apparatus by test, the tension of the spring $X^{18}$ may be adjusted by means of the nut $x^{15}$. Thus it will be seen that I provide an arm which is operated upon at a predetermined leverage by a spring under predetermined tension, and in opposition to the action of the spring is a water-pressure at a predetermined depth, and these two forces balance each other when the boat is running at the mean desired depth.

It will be obvious that a diaphragm may be used in place of the piston $X'$, as is well known in the torpedo and submarine-boat art, and I mean to cover either a cylinder and piston or a cylinder and a diaphragm for operating the diving-rudders by the pressure of the water of flotation.

It is clear that the function of the diving mechanism is subject to the degree of buoyancy of the boat, but that the diving mechanism can be changed to conform to such varying conditions. It is also obvious that while this principle applies to the depth that may be reached at a given speed and water-pressure upon the piston or diaphragm it especially relates to the curvature of the boat's path in diving, the same becoming flatter as the buoyancy and speed are increased.

It will be obvious that various modifications might be made in the herein-described apparatus, and various changes made in the construction, combination, and arrangements of parts which might be used without departing from the spirit of my invention.

I have shown the various parts of the apparatus as located in certain positions of the boat; but I do not mean to confine the use of said apparatus to any stated position, as the relative arrangement of the parts would be varied widely in boats of different sizes and also in boats intended to be used under different conditions.

Having thus described my invention, what I claim, and desire to secure by Letters Patent of the United States, is—

1. A diving apparatus for submarine boats comprising a hand-operable pivoted arm, one or more diving-rudders controlled thereby, a spring acting on said arm under tension and the pressure of the water of flotation acting on said arm in opposition to said spring, substantially as described.

2. A diving apparatus for submarine boats comprising one or more diving-rudders, a hand-operable pivoted arm for controlling said rudders, a spring acting on said arm under tension, means for adjusting the tension of said spring, and means for transmitting the pressure of the water of flotation against said arm in opposition to said spring, substantially as described.

3. Diving apparatus for use in submarine boats comprising one or more diving-rudders, a hand-operable pivoted arm, mechanism for transmitting the motion of said arm to said rudder or rudders, a spring under tension tending to move said arm in one direction, means for varying the tension of said spring, and means for transmitting the pressure of the water of flotation against said arm in opposition to the said spring, substantially as described.

4. Diving apparatus for use in submarine boats comprising one or more diving-rudders, a pivoted arm, mechanism for transmitting the motion of said arm to said rudder or rudders, a spring under tension tending to move said arm in one direction, means for varying the point of application of said spring to said arm, and means for transmitting the pressure of the water of flotation against said arm in opposition to said spring, substantially as described.

5. A diving apparatus for submarine boats comprising one or more diving-rudders controlled by an arm, a spring acting on said arm under tension and the pressure of the water of flotation acting on said arm in opposition to said spring, with means for locking said arm in any desired position, substantially as described.

6. In a diving apparatus for submarine boats comprising one or more diving-rudders, an arm for controlling said rudders, a spring acting on said arm under tension, means for adjusting the tension of said spring, and means for transmitting the pressure of the water of flotation against said arm in opposition to said spring, with means for locking said arm in any desired position, substantially as described.

7. Diving apparatus for use in submarine boats comprising one or more diving-rudders, a pivoted arm, mechanism for transmitting the motion of said arm to said rudder or rudders, a spring under tension tending to move said arm in one direction, means for varying the tension of said spring, and means for transmitting the pressure of the water of flotation against said arm in opposition to the said spring, with means for locking said arm in any desired position, substantially as described.

8. Diving apparatus for use in submarine boats comprising one or more diving-rudders, a pivoted arm, mechanism for transmitting the motion of said arm to said rudder or rudders, a spring under tension tending to move said arm in one direction, means for varying the point of application of said spring to said arm, means for transmitting the pressure of the water of flotation against said arm in opposition to said spring, with means for locking said arm in any desired position, substantially as described.

9. A diving apparatus for submarine boats comprising one or more diving-rudders controlled by an arm, a spring acting on said arm under tension and the pressure of the water of flotation acting on said arm in opposition to said spring, with means for locking said arm in any desired position, and independent means for holding said arm in the initial position, and for releasing same when desired, substantially as described.

10. A diving apparatus, for submarine boats comprising one or more diving-rudders, an arm for controlling said rudders, a spring acting on said arm under tension, means for adjusting the tension of said spring, and means for transmitting the pressure of the water of flotation against said arm in opposition to said spring, with means for locking said arm in any desired position, and independent means for holding said arm in the initial position, and for releasing same when desired, substantially as described.

11. Diving apparatus for use in submarine boats comprising one or more steering-rudders, a pivoted arm, mechanism for transmitting the motion of said arm to said steering rudder or rudders, a spring under tension tending to move said arm in one direction, means for varying the tension of said spring, and means for transmitting the pressure of the water of flotation against said arm in opposition to the said spring, with means for locking said arm in any desired position, and independent means for holding said arm in the initial position, and for releasing same when desired, substantially as described.

12. Diving apparatus for use in submarine boats comprising one or more steering-rudders, a pivoted arm, mechanism for transmitting the motion of said arm to said steering-rudder, or rudders, a spring under tension tending to move said arm in one direction, means for varying the point of application of said spring to said arm, means for transmitting the pressure of the water of flotation against said arm in opposition to said spring, with means for locking said arm in any desired position, and independent means for holding said arm in the initial position, and for releasing same when desired, substantially as described.

13. A diving apparatus for submarine boats comprising one or more diving-rudders, an arm for controlling said rudders, a spring acting on said arm under tension, means for adjusting the point of application of said spring to said arm, and means for transmitting the pressure of the water of flotation against said arm in opposition to said spring, substantially as described.

14. Diving apparatus for use in submarine boats comprising one or more diving-rudders, a pivoted arm, mechanism for transmitting the motion of said arm to said rudder or rudders, a spring under tension tending to move said arm in one direction, means for moving the point of application of said spring to said arm, toward and away from the pivot of said arm, and means for transmitting the pressure of the water of flotation against said arm in opposition to the said spring, substantially as described.

15. Diving apparatus for use in submarine boats comprising one or more diving-rudders, a pivoted arm, mechanism for transmitting the motion of said arm to said rudder or rudders, a spring under tension tending to move said arm in one direction, means for varying the point of application of said spring to said arm, and mechanism for transmitting the pressure of the water of flotation against said arm in opposition to said spring, substantially as described.

16. A diving apparatus for submarine boats comprising a hand-operable pivoted arm, one or more diving-rudders controlled thereby, a spring acting on said arm under tension and automatic mechanism for causing the pressure of the water of flotation to act on said arm in opposition to said spring, substantially as described.

17. A diving apparatus for submarine boats comprising one or more diving-rudders, a hand-operable pivoted arm for controlling said rudders, a spring acting on said arm under tension, means for adjusting the tension of said spring, and automatic mechanism for transmitting the pressure of the water of flotation against said arm in opposition to said spring, substantially as described.

18. Diving apparatus for use in submarine boats comprising one or more diving-rudders, a hand-operable pivoted arm, mechanism for transmitting the motion of said arm to said rudder or rudders, a spring under tension tending to move said arm in one direction, means for varying the tension of said spring, and automatic mechanism for transmitting the pressure of the water of flotation against said arm in opposition to said spring, substantially as described.

19. Diving apparatus for use in submarine boats comprising one or more diving-rudders, a pivoted arm, mechanism for transmitting the motion of said arm to said rudder or rudders, a spring under tension tending to move said arm in one direction, means for varying the point of application of said spring to said arm, and automatic mechanism for transmitting the pressure of the water of flotation against said arm in opposition to said spring, substantially as described.

20. A diving apparatus for submarine boats comprising one or more diving-rudders controlled by an arm, a spring acting on said arm under tension, automatic mechanism for causing the pressure of the water of flotation to act on said arm in opposition to said spring, with means for locking said arm in any desired position, and for releasing same when desired, substantially as described.

21. In a diving apparatus for submarine boats comprising one or more diving-rudders, an arm for controlling said rudders, a spring acting on said arm under tension, means for adjusting the tension of said spring, automatic mechanism for transmitting the pressure of the water of flotation against said arm in opposition to said spring, with means for locking said arm in any desired position, and for releasing same when desired, substantially as described.

22. Diving apparatus for use in submarine boats comprising one or more diving-rudders, a pivoted arm, mechanism for transmitting the motion of said arm to said rudder or rudders, a spring under tension tending to move said arm in one direction, means for varying the tension of said spring, and automatic mechanism for transmitting the pressure of the water of flotation against said arm in opposition to the said spring, with means for locking said arm in any desired position, and for releasing same when desired, substantially as described.

23. Diving apparatus for use in submarine boats comprising one or more diving-rudders, a pivoted arm, mechanism for transmitting the motion of said arm to said rudder or rudders, a spring under tension tending to move said arm in one direction, means for varying the point of application of said spring to said arm, automatic mechanism for transmitting the pressure of the water of flotation against said arm in opposition to said spring, and means for locking said arm in any desired position, and for releasing same when desired, substantially as described.

24. A diving apparatus for submarine boats comprising diving-rudders controlled by an arm, a spring acting on said arm under tension, automatic mechanism for causing the pressure of the water of flotation to act on said arm in opposition to said spring, means for locking said arm in any desired position, with independent means for holding said arm in the initial position, and means for releasing said arm when desired, substantially as described.

25. A diving apparatus for submarine boats comprising diving-rudders, a pivoted arm for controlling said rudders, a spring acting on said arm under tension, means for adjusting the tension of said spring, means for causing said spring to act at a longer or shorter leverage on said arm, and means for transmitting the pressure of the water of flotation against said arm in opposition to said spring, substantially as described.

26. Diving apparatus for use in submarine boats comprising diving-rudders, a pivoted arm, mechanism for transmitting the motion of said arm to said rudders, a spring under tension tending to move said arm in one direction, means for varying the tension of said spring, means for causing said spring to act at a longer or shorter leverage on said arm, and automatic mechanism for transmitting the pressure of the water of flotation against said arm in opposition to said spring, substantially as described.

27. Diving apparatus for use in submarine boats comprising diving-rudders, a pivoted arm, mechanism for transmitting the motion of said arm to said rudders, a spring under tension tending to move said arm in one direction, means for varying the tension of said spring, means for varying the point of application of said spring to said arm, and automatic mechanism for transmitting the pressure of the water of flotation against said arm in opposition to said spring, substantially as described.

28. A diving apparatus for submarine boats, comprising one or more diving-rudders, a hand-operable pivoted arm for controlling said rudders, a spring acting on said arm under tension, and automatic means for transmitting the pressure of the water of flotation against said arm in opposition to said spring, substantially as described.

29. Diving apparatus for use in submarine boats comprising one or more diving-rudders, a pivoted arm, mechanism for transmitting the motion of said arm to said rudder or rudders, a spring under tension tending to move said arm in one direction, means for moving the point of application of said spring to said arm, toward and away from the pivot of said arm, a fluid-pressure cylinder connected to the water of flotation, a piston in said cylinder, and mechanism automatically operated by the motion of said piston for rocking said arm against the action of said spring, substantially as described.

30. Diving apparatus for use in submarine boats comprising one or more diving-rudders, a hand-operable pivoted arm, mechanism for transmitting the motion of said arm to said rudder or rudders, a spring under tension tending to move said arm in one direction, a fluid-pressure cylinder connected to the water of flotation, a piston in said cylinder, and mechanism automatically operated by the motion of said piston for rocking said arm against the action of said spring, substantially as described.

31. A diving apparatus for submarine boats comprising a hand-operable pivoted arm, one or more diving-rudders controlled thereby, a spring acting on said arm under tension, a fluid-pressure cylinder connected to the water of flotation, a piston in said cylinder, and mechanism automatically operated by the motion of said piston for rocking said arm against the action of said spring, substantially as described.

32. A diving apparatus for submarine boats comprising one or more diving-rudders, a hand-operable pivoted arm for controlling said rudders, a spring acting on said arm under tension, means for adjusting the tension of said spring, a fluid-pressure cylinder connected to the water of flotation, a piston in said cylinder, and mechanism automatically operated by the motion of said piston for rocking said arm against the action of said spring, substantially as described.

33. Diving apparatus for use in submarine boats comprising one or more diving-rudders, a hand-operable pivoted arm, mechanism for transmitting the motion of said arm to said rudder or rudders, a spring under tension tending to move said arm in one direction, means for varying the tension of said spring, and automatic means for transmitting the pressure of the water of flotation against said arm in opposition to the said spring, comprising a cylinder and piston, and mechanism operated by said piston for rocking said arm against the action of said spring, substantially as described.

34. Diving apparatus for use in submarine boats comprising one or more diving-rudders, a pivoted arm, mechanism for transmitting the motion of said arm to said rudder or rudders, a spring under tension tending to move said arm in one direction, means for varying the point of application of said spring to said arm, and automatic means for transmitting the pressure of the water of flotation against said arm in opposition to said spring, comprising a cylinder and piston, and mechanism operated by said piston for rocking said arm against the action of said spring, substantially as described.

35. A diving apparatus for submarine boats comprising one or more diving-rudders controlled by an arm, a spring acting on said arm under tension, automatic means for causing the pressure of the water of flotation to act on said arm in opposition to said spring, comprising a cylinder and piston, and mechanism operated by said piston for rocking said arm against the action of said spring, with means for locking said arm in any desired position, and for releasing same when desired, substantially as described.

36. In a diving apparatus for submarine boats comprising one or more diving-rudders, an arm for controlling said rudders, a spring acting on said arm under tension, means for adjusting the tension of said spring, automatic means for transmitting the pressure of the water of flotation against said arm in opposition to said spring, comprising a cylinder and piston, and mechanism operated by said piston for rocking said arm against the action of said spring, with means for locking said arm in any desired position, and for releasing same when desired, substantially as described.

37. Diving apparatus for use in submarine boats comprising one or more diving-rudders, a pivoted arm, mechanism for transmitting the motion of said arm to said rudder or rudders, a spring under tension tending to move said arm in one direction, means for varying the tension of said spring, and automatic means for transmitting the pressure of the water of flotation against said arm in opposition to the said spring, comprising a cylinder and piston, and mechanism operated by said piston for rocking said arm against the action of said spring, with means for locking said arm in any desired position, and for releasing same when desired, substantially as described.

38. Diving apparatus for use in submarine boats comprising one or more diving-rudders, a pivoted arm, mechanism for transmitting the motion of said arm to said rudder or rudders, a spring under tension tending to move said arm in one direction, means for varying the point of application of said spring to said arm, automatic means for transmitting the pressure of the water of flotation against said arm in opposition to said spring, comprising a cylinder and piston, and mechanism operated by said piston for rocking said arm against the action of said spring, with means for locking said arm in any desired position, independent means for holding said arm in the initial position, and means for releasing said arm when desired, substantially as described.

39. A diving apparatus for submarine boats comprising diving-rudders, a pivoted arm for controlling said rudders, a spring acting on said arm under tension, means for adjusting the tension of said spring, means for causing said spring to act at a longer or shorter leverage on said arm, and automatic means for transmitting the pressure of the water of flotation against said arm in opposition to said spring, comprising a cylinder and piston, and mechanism operated by said piston for rocking said arm against the action of said spring, substantially as described.

40. A diving apparatus for submarine boats comprising diving-rudders controlled by an arm, a spring acting on said arm under tension, automatic means for causing the pressure of the water of flotation to act on said arm in opposition to said spring, comprising a cylinder and piston, and mechanism operated by said piston for rocking said arm against the action of said spring, and means for locking said arm in any desired position and for releasing same when desired, substantially as described.

41. Diving apparatus for use in submarine boats comprising diving-rudders, a pivoted arm, mechanism for transmitting the motion of said arm to said rudders, a spring under tension tending to move said arm in one direction, means for varying the tension of said spring, means for causing said spring to act at a longer or shorter leverage on said arm, and automatic means for transmitting the pressure of the water of flotation against said arm in opposition to said spring, comprising a cylinder and piston, and mechanism operated by said piston for rocking said arm against the action of said spring, substantially as described.

42. Diving apparatus for use in submarine boats comprising diving-rudders, a pivoted arm, mechanism for transmitting the motion of said arm to said rudders, a spring under tension tending to move said arm in one direction, means for varying the tension of said spring, means for varying the point of application of said spring to said arm, and automatic means for transmitting the pressure of the water of flotation against said arm in opposition to said spring, comprising a cylinder and piston, and mechanism operated by said piston, for rocking said arm against the action of said spring, substantially as described.

43. Diving apparatus for use in submarine boats comprising one or more diving-rudders, a pivoted arm, mechanism for transmitting the motion of said arm to said rudder or rudders, a spring under tension tending to move said arm in one direction, means for moving the point of application of said spring to said arm, toward and away from the pivot of said arm, a fluid-pressure cylinder connected to the water of flotation, a valve controlling the admission of water to said cylinder, automatic mechanism for opening and closing said valve, a piston in said cylinder, and mechanism operated by the motion of said piston for rocking said arm against the action of said spring, substantially as described.

44. Diving apparatus for use in submarine boats comprising one or more diving-rudders, a pivoted arm, mechanism for transmitting the motion of said arm to said rudder or rudders, a spring under tension tending to move said arm in one direction, a fluid-pressure cylinder connected to the water of flotation, a valve controlling the admission of water to said cylinder, automatic mechanism for opening and closing said valve, a piston in said cylinder, and mechanism operated by the motion of said piston for rocking said arm against the action of said spring, substantially as described.

45. A diving apparatus for submarine boats comprising one or more diving-rudders controlled by an arm, a spring acting on said arm under tension, a fluid-pressure cylinder connected to the water of flotation, a valve controlling the admission of water to said cylinder, automatic mechanism for opening and closing said valve, a piston in said cylinder, and mechanism operated by the motion of said piston for rocking said arm against the action of said spring, substantially as described.

46. A diving apparatus for submarine boats comprising one or more diving-rudders, an arm for controlling said rudders, a spring acting on said arm under tension, means for adjusting the tension of said spring, a fluid-pressure cylinder connected to the water of flotation, a valve controlling the admission of water to said cylinder, automatic mechanism for opening and closing said valve, a piston in said cylinder, and mechanism operated by the motion of said piston for rocking said arm against the action of said spring, substantially as described.

47. Diving apparatus for use in submarine boats comprising one or more diving-rudders, a pivoted arm, mechanism for transmitting the motion of said arm to said rudder or rudders, a spring under tension tending to move said arm in one direction, means for varying the tension of said spring, and automatic means for transmitting the pressure of the water of flotation against said arm in opposition to the said spring, comprising a cylinder and piston, a valve admitting the admission of water to said cylinder, automatic mechanism for opening and closing said valve, and mechanism operated by said piston for rocking said arm against the action of said spring, substantially as described.

48. Diving apparatus for use in submarine boats comprising one or more diving-rudders, a pivoted arm, mechanism for transmitting the motion of said arm to said rudder or rudders, a spring under tension tending to move said arm in one direction, means for varying the point of application of said spring to said arm, and automatic means for transmitting the pressure of the water of flotation against said arm in opposition to said spring, comprising a cylinder and piston, a valve controlling the admission of water to said cylinder, automatic mechanism for opening and closing said valve, and mechanism operated by said piston for rocking said arm against the action of said spring, substantially as described.

49. A diving apparatus for submarine boats comprising one or more diving-rudders controlled by an arm, a spring acting on said arm under tension, automatic means for causing the pressure of the water of flotation to act on said arm in opposition to said spring, comprising a cylinder and piston, a valve controlling the admission of water to said cylinder, automatic mechanism for opening and closing said valve, and mechanism operated by said piston for rocking said arm against the action of said spring, with means for locking said arm in any desired position, and for releasing same when desired, substantially as described.

50. In a diving apparatus for submarine boats comprising one or more diving-rudders, an arm for controlling said rudders, a spring acting on said arm under tension, means for adjusting the tension of said spring, automatic means for transmitting the pressure of the water of flotation against said arm in opposition to said spring, comprising a cylinder and piston, a valve controlling the admission of water to said cylinder, automatic mechanism for opening and closing said valve, and mechanism operated by said piston for rocking said arm against the action of said spring, with means for locking said arm in any desired position, and for releasing same when desired, substantially as described.

51. Diving apparatus for use in submarine boats comprising one or more diving-rudders, a pivoted arm, mechanism for transmitting the motion of said arm to said rudder or rudders, a spring under tension tending to move said arm in one direction, means for varying the point of application of said spring to said arm, automatic means for transmitting the pressure of the water of flotation against said arm in opposition to said spring, comprising a cylinder and piston, a valve controlling the admission of water to said cylinder, automatic mechanism for opening and closing said valve, and mechanism operated by said piston for rocking said arm against the action of said spring, with means for locking said arm in any desired position, independent means for holding said arm in the initial position, and means for releasing said arm when desired, substantially as described.

52. A diving apparatus for submarine boats comprising diving-rudders, a pivoted arm for controlling said rudders, a spring acting on said arm under tension, means for adjusting the tension of said spring, means for causing said spring to act at a longer or shorter leverage on said arm, and automatic means for transmitting the pressure of the water of flotation against said arm in opposition to said spring, comprising a cylinder and piston, a valve controlling the admission of water to said cylinder, automatic mechanism for opening and closing said valve, and mechanism operated by said piston for rocking said arm against the action of said spring, substantially as described.

53. A diving apparatus for submarine boats comprising diving-rudders controlled by an arm, a spring acting on said arm under tension, automatic means for causing the pressure of the water of flotation to act on said arm in opposition to said spring, comprising a cylinder and piston, and mechanism operated by said piston for rocking said arm against the action of said spring, a valve controlling the admission of water to said cylinder, automatic mechanism for opening and closing said valve, and means for locking said arm in any desired position and for releasing same when desired, substantially as described.

54. Diving apparatus for use in submarine boats comprising one or more diving-rudders, a pivoted arm, mechanism for transmitting the motion of said arm to said rudder or rudders, a spring under tension tending to move said arm in one direction, means for moving the point of application of said spring to said arm, toward and away from the pivot of said arm, a fluid-pressure cylinder connected to the water of flotation, a piston in said cylinder, and mechanism operated by the motion of said piston for rocking said arm against the action of said spring, a valve controlling the admission of water to said cylinder, a spring-constrained arm for opening and closing said valve, and automatic means, operated by the mechanism for shifting the diving-rudders, for actuating said valve-arm, substantially as described.

55. Diving apparatus for use in submarine boats comprising one or more diving-rudders, a pivoted arm, mechanism for transmitting the motion of said arm to said rudder or rudders, a spring under tension tending to move said arm in one direction, a fluid-pressure cylinder connected to the water of flotation, a piston in said cylinder, and mechanism operated by the motion of said piston for rocking said arm against the action of said spring, a valve controlling the admission of water to said cylinder, a spring-constrained arm for opening and closing said valve, and automatic means, operated by the mechanism for shifting the diving-rudders, for actuating said valve-arm, substantially as described.

56. A diving apparatus for submarine boats comprising one or more diving-rudders controlled by an arm, a spring acting on said arm under tension, a fluid-pressure cylinder connected to the water of flotation, a piston in said cylinder, and mechanism operated by the motion of said piston for rocking said arm against the action of said spring, a valve controlling the admission of water to said cylinder, a spring-constrained arm for opening and closing said valve, and automatic means, operated by the mechanism for shifting the diving-rudders, for actuating said valve-arm, substantially as described.

57. A diving apparatus for submarine boats comprising one or more diving-rudders, an arm for controlling said rudders, a spring acting on said arm under tension, means for adjusting the tension of said spring, a fluid-pressure cylinder connected to the water of flotation, a piston in said cylinder, and mechanism operated by the motion of said piston for rocking said arm against the action of said spring, a valve controlling the admission of water to said cylinder, a spring-constrained arm for opening and closing said valve, and automatic means, operated by the mechanism for shifting the diving-rudders, for actuating said valve-arm, substantially as described.

58. Diving apparatus for use in submarine boats comprising one or more diving-rudders, a pivoted arm, mechanism for transmitting the motion of said arm to said rudder or rudders, a spring under tension tending to move said arm in one direction, means for varying the tension of said spring, and automatic means for transmitting the pressure of the water of flotation against said arm in opposition to the said spring, comprising a cylinder and piston, and mechanism operated by said piston for rocking said arm against the action of said spring, a valve controlling the admission of water to said cylinder, a spring-constrained arm for opening and closing said valve, and automatic means, operated by the mechanism for shifting the diving-rudders, for actuating said valve-arm, substantially as described.

59. Diving apparatus for use in submarine boats comprising one or more diving-rudders, a pivoted arm, mechanism for transmitting the motion of said arm to said rudder or rudders, a spring under tension tending to move said arm in one direction, means for varying the point of application of said spring to said arm, and automatic means for transmitting the pressure of the water of flotation against said arm in opposition to said spring, comprising a cylinder and piston, and mechanism operated by said piston for rocking said arm against the action of said spring, a valve controlling the admission of water to said cylinder, a spring-constrained arm for opening and closing said valve, and automatic means, operated by the mechanism for shifting the diving-rudders, for actuating said valve-arm, substantially as described.

60. A diving apparatus for submarine boats comprising one or more diving-rudders controlled by an arm, a spring acting on said arm under tension, automatic means for causing the pressure of the water of flotation to act on said arm in opposition to said spring, comprising a cylinder and piston, and mechanism operated by said piston for rocking said arm against the action of said spring, with means for locking said arm in any desired position, and for releasing same when desired, a valve controlling the admission of water to said cylinder, a spring-constrained arm for opening and closing said valve, and automatic means, operated by the mechanism for shifting the diving-rudders, for actuating said valve-arm, substantially as described.

61. In a diving apparatus for submarine boats comprising one or more diving-rudders, an arm for controlling said rudders, a spring acting on said arm under tension, means for adjusting the tension of said spring, automatic means for transmitting the pressure of the water of flotation against said arm in opposition to said spring, comprising a cylinder and piston, and mechanism operated by said piston for rocking said arm against the action of said spring, with means for locking said arm in any desired position and for releasing same when desired, a valve controlling the admission of water to said cylinder, a spring-constrained arm for opening and closing said valve, and automatic means operated by the mechanism for shifting the diving-rudders for actuating said valve-arm, substantially as described.

62. Diving apparatus for use in submarine boats comprising one or more diving-rudders, a pivoted arm, mechanism for transmitting the motion of said arm to said rudder or rudders, a spring under tension tending to move said arm in one direction, means for varying the point of application of said spring to said arm automatic means for transmitting the pressure of the water of flotation against said arm in opposition to said spring, comprising a cylinder and piston, and mechanism operated by said piston for rocking said arm against the action of said spring, with means for locking said arm in any desired position, and means for releasing said arm when desired, a valve controlling the admission of water to said cylinder, a spring-constrained arm for opening and closing said valve, and automatic means, operated by the mechanism for shifting the diving-rudders, for actuating said valve-arm, substantially as described.

63. A diving apparatus for submarine boats comprising diving-rudders, a pivoted arm for controlling said rudders, a spring acting on said arm under tension, means for adjusting the tension of said spring, means for causing said spring to act at a longer or shorter leverage on said arm, and automatic means for transmitting the pressure of the water of flotation against said arm in opposition to said spring, comprising a cylinder and piston, and mechanism operated by said piston for rocking said arm against the action of said spring, a valve controlling the admission of water to said cylinder, a spring-constrained arm for opening and closing said valve, and automatic means, operated by the mechanism for shifting the diving-rudders, for actuating said valve-arm, substantially as described.

64. A diving apparatus for submarine boats comprising diving-rudders controlled by an arm, a spring acting on said arm under tension, automatic means for causing the pressure of the water of flotation to act on said arm in opposition to said spring, comprising a cylinder and piston, and mechanism operated by said piston for rocking said arm against the action of said spring, and means for locking said arm in any desired position and for releasing same when desired, a valve controlling the admission of water to said cylinder, a spring-constrained arm for opening and closing said valve, and automatic means, operated by the mechanism for shifting the diving-rudders, for actuating said valve-arm, substantially as described.

In testimony whereof I affix my signature in presence of two witnesses.

THOMAS HENRY WHELESS.

Witnesses:
E. B. JOHN,
A. CONROW.